Patented Aug. 3, 1926.

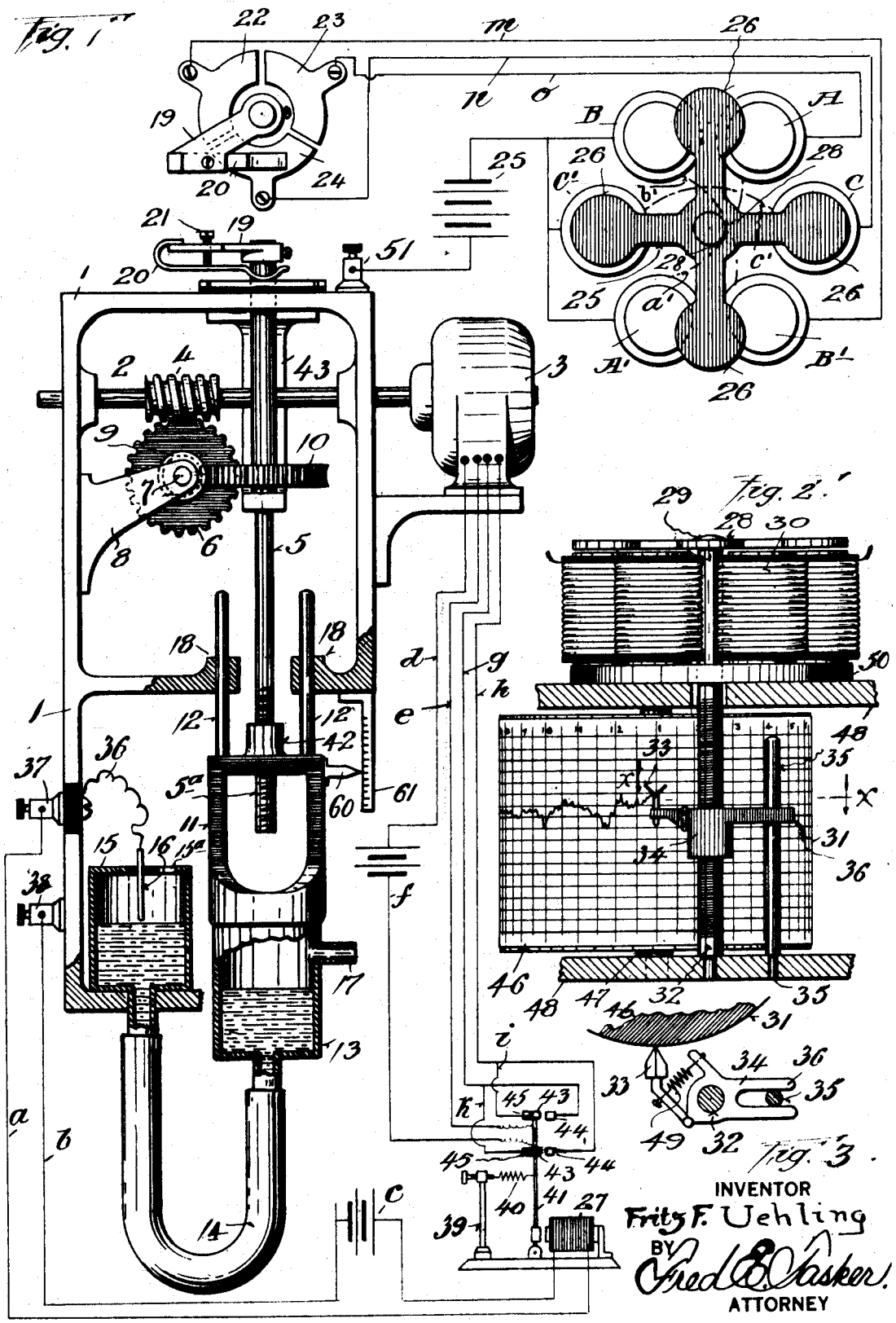

1,594,581

UNITED STATES PATENT OFFICE.

FRITZ FREDERICK UEHLING, OF PASSAIC, NEW JERSEY.

APPARATUS FOR RECORDING FLUID-PRESSURE FLUCTUATIONS AND THE LIKE.

Application filed February 10, 1922. Serial No. 535,566.

My present invention relates to certain new and useful improvements in apparatus for indicating, recording and registering changes or fluctuations in the pressure of a gas, fluid, liquid, or other substance. The object is to provide a simple, efficient and easily operated mechanism for the purpose; one that by reason of its simple combination of mechanical and electrical members will not be apt to get out of order, and one whose record will be made with certainty and invariable accuracy at all times, and with any kind of fluid or other pressure, and with the recorder at any distance from the fluid whose changes are being recorded.

The fundamental features of the invention consist in the employment of a U-tube consisting of two flexibly connected legs or chambers, there being a liquid or fluid carried therein, with means for keeping the level of the liquid in both chambers constant with relation to the respective chambers themselves, or their walls, regardless of what definte pressure may be exerted on the surface of the liquid in either or both of the chambers or legs of said U-tube. To accomplish this condition with respect to the level of the liquid in each of the legs of the U-tube, there is provided a means to change the position of one, or the other, or both of said legs for every different pressure that might be exerted on the surface of the liquid in either of the legs.

Among special applications of my broad idea I have shown and described in this application, in geared connection with said means for changing the position of one or more of the legs of the U-tube, a commutator which operates, at any distance, an electric recording gauge the pen or marker of which moves in one direction or another in exact proportion to any change in the relative position of the legs of the U-tube and consequently in exact proportion to any change in pressure exerted on the surface of the liquid in one or the other of said legs of the U-tube. This idea may be expressed mechanically in many different ways, and the particular construction set forth herein is only one form of many that might be used.

With these objects mentioned and many others in view, the invention may be said to further consist essentially in the construction, arrangement and combination of parts, and in numerous details and peculiarities thereof, substantially as will be hereinafter more fully described and claimed.

In the accompanying drawing illustrating my invention:

Figure 1 is a sectional front elevation of my pressure-indicating and recording apparatus, with the electrical devices applied as a part thereof shown in a diagrammatic or conventional manner.

Figure 2 is a side elevation of one form of recording mechanism, including the record sheet and marker, together with the operating means.

Figure 3 is a detail plan view of the pen or marker which traces a record on the card or sheet, certain parts of this view being on the line $x$, $x$, of Figure 2.

Similar characters of reference designate like parts throughout the different figures of the drawing.

For explanatory purposes I assume that the gas, fluid, or other substance, the varying pressure of which is to be measured and recorded, is contained in some kind of main, tank or reservoir (not shown), at a point located at any reasonable distance from a U-tube consisting of chamber 13, flexible connection 14 and chamber 15, and with which main or other container, one leg or chamber 13 of said U-tube is connected through the lateral branch pipe or passage 17. Therefore it will be understood that pipe 17 itself and presumably other connected parts contains the gas or fluid whose pressure is rising and falling from time to time, and which changes of pressure it is desirable to note and record in a continuous and reliable manner at any distance whatsoever from the source of pressure.

My apparatus comprises primarily and fundamentally two intercommunicating chambers 13 and 15, containing in the specific apparatus described a quantity of mercury or other liquid metal or substance serving as an electrical conductor, and which in chamber 13 is acted on by the gas pressure which results in disturbing its level in said chamber and also correspondingly changing the level of the mercury in the other chamber 15. A flexible rubber or other tube 14 runs from chamber 13 to chamber 15 and this tube as well as a portion of the interior of each chamber contains the mercury. The gas which enters the chamber 13 through pipe 17 presses upon the surface of the mercury, and as its pressure increases depresses the level in chamber 13 and raises the level in chamber 15, so that any change in the level of the mercury in chamber 13 results in a corresponding change in level of the mercury in chamber 15. The vertical distances, however, between the two levels of the bodies of mercury in the two chambers remain the same so long as the gas pressure is constant, and this is true no matter how far the chamber 13 may change its position relatively to chamber 15. Chamber 13 can therefore be moved up or down to a definite position for every definite pressure exerted on the liquid therein so that the level of the liquid in chamber 15 will be the same for any such pressure. In my apparatus chamber 13 is automatically moved to a definite position for every different pressure so that the level of the liquid in chamber 15 is the same for any pressure that may be exerted on the mercury in chamber 13. I shall presently explain more fully how this is accomplished, as also the purpose thereof.

It will be seen that the two chambers 13 and 15 connected by a U-shaped tube are really only the enlarged terminals of said tube, and that therefore instead of conceiving the plan to consist of chambers, a broader concept would be to describe the combination as a U-tube having a fixed leg and a movable leg, or a U-tube the legs of which can change their position with respect to each other, and containing a fluid or liquid; and in so referring to a U-tube I comprehend within the meaning a great variety of forms or legs or compartments, one varying its position in relation to the other, and both connecting by a passage through which a fluid adjusts itself.

In the present specific embodiment of the invention, therefore, which I have set forth for explanatory purposes only, and with no idea of being confined to the details thereof, one of the chambers, as 15, is stationary, being mounted on some suitable part of the main frame 1, while the other chamber, as 13, is vertically-movable. In the upper end of the chamber 15 is an insulated stationary electrode or contact pin 16, the inner end of which is so located within chamber 15 that the mercury therein will make contact with the electrode, the latter submerging its end therein as the level of the mercury rises, which contact closes an electric circuit as I shall presently describe. The outer end of electrode 16 connects by wire 36 with an insulated binding post 37 in the side of the frame 1, from which post 37 runs a conducting wire $a$. In the top of chamber 15 is a vent opening 15$^a$ which admits air at atmospheric pressure to fill the chamber 15 above the mercury and cause the level thereof to drop when the diminishing gas pressure in the other chamber allows the mercury level therein to rise.

The movable chamber 13 carries a yoke or skeleton head 11, at the center of which is a boss 42 serving as an internally-threaded nut to receive the screw-threaded portion 5$^a$ of a vertically rotary shaft 5, which I term a commutator shaft, on which shaft the chamber 13 travels up and down, depending upon the direction in which the shaft is turning, the chamber 13 being kept from revolving by the guide rods 12, 12, which slide through guide openings 18, 18, in the main frame 1.

The shaft 5 is in geared connection with an electric motor 3, said motor being reversible so that at one time it drives the shaft 5 in one direction and at another time will drive it in the reverse direction. The direction in which the motor is operating, as I will later describe, depends upon whether the contact pin or electrode 16 is in contact or out of contact with the mercury in chamber 15. Therefore the effect of making or breaking contact between the contact pin 16 and the mercury in chamber 15 can be made such that when the contact pin is in contact with the mercury the motor will cause the chamber 13 to descend, and when the contact pin is out of contact with the mercury the motor will cause the chamber 13 to rise. It is obvious of course that the same result can be obtained by using two motors, one operative in one direction and the other operative in the opposite direction, but in the present form of my invention I prefer to use a single series wound motor which lends itself well to reversing in the manner above stated.

The shaft 5 is carried vertically in the frame 1 and in a bracket 43 secured in the upper portion of said frame, while the upper end of shaft 5 carries a horizontal arm 19 provided with a spring contact or brush 20, the tension of which is regulated by a set screw 21, which brush rides over a series of commutator segments 22, 23 and 24, during the movement of the brush 20 consequent upon the revolution of shaft 5. The segments are permanently fastened to but insulated from the main frame 1 as shown in Figure 1, so that as the brush 20 passes over them an electric current will be properly commutated through different circuits to an electric recording device for making a graphic record which will visualize all pressure changes in the space above the mercury in chamber 13.

The geared connection between the motor 3 and shaft 5 consists of worm 4 on a shaft 2 suitably journaled in the main frame 1, which worm 4 meshes with and drives a worm wheel 6 on a stud or shaft 7 journaled in a bracket 8 attached to frame 1, said shaft 7 carrying also a worm 9 that meshes with and drives a worm wheel 10 fast on the upright shaft 5, so that in this way the latter shaft is revolved in one direction or the reverse depending upon the direction in which the motor 3 is operating with the result of closing a series of circuits by means of brush 20 through the segments of the commutator, to be presently described.

I will next describe how electrical connections are made to automatically cause the motor 3 to run forward or back, and thus impart motion to shaft 5 in one direction or the other in correspondence with the increase or decrease of the gas or fluid pressure in pipe 17 and the connections communicating therewith; and then I will point out how the action of the shaft 5 produces the proper effect in the recording mechanism when it communicates motion thereto.

Somewhere near the main frame 1, or otherwise, as may be convenient, is located a relay so connected with the motor 3 that when the electromagnet 27 of said relay is energized it will cause the motor to run in one direction and when not energized it will cause the motor to run in the opposite direction. The electromagnet 27 is in the electric circuit which starts at battery $c$, passes through wire $b$, through binding post 38, thence through frame 1, through the mercury in chamber 15, and if contact pin 16 touches the mercury the circuit will continue through said contact pin and wire 36, through the insulated binding post 37, through wire $a$, through electromagnet 27 back to battery $c$. Thus when the electrode 16 makes contact with the mercury in chamber 15, the electromagnet 27 will attract the armature of the relay, thereby pulling over the lever 41 and thus throwing the motor 3 into circuit with battery $f$, through contact blocks 44, 44, and 43, 43, causing it to run in a direction that will lower chamber 13. As the chamber 13 is lowered, the mercury level in chamber 15 will also be lowered until the electric contact between the electrode 16 and the mercury in chamber 15 is again broken, at which time the electromagnet 27 will cease to act, when a spring 40, adjustably connected to a post 39 draws the lever 41 away from the magnet. This throws the motor into circuit with battery $f$ through contact blocks 45, 45, and 43, 43, which reverses it and again causes the chamber 13 to rise. The way in which the series wound motor 3 is reversed through the action of the relay is as follows: The contact blocks 43, 43, which are fastened to the lever 41, are insulated from each other and are connected with the field of the motor in circuit with battery $f$, through wires $d$ and $e$ as shown. Wires $g$ and $h$ lead from the brushes of the motor so that in order to start the motor, all that is necessary is to connect contact blocks 43, 43, with wires $g$ and $h$. This is accomplished in the position illustrated by means of contact blocks 45, 45, and wires $k$ and $i$, but when the electromagnet 27 throws contact blocks 43, 43, into contact with blocks 44, 44, the motor will be reversed due to the changes in the direction of the current through wires $g$ and $h$ which lead to the armature of the motor. The chamber 13 will therefore be moved down or up by the motor depending upon whether the pressure above the mercury in chamber 13 causes the mercury in chamber 15 to be in or out of contact with the electrode 16.

Any change in pressure of the gas or other fluid in the space above the mercury in chamber 13 will therefore cause the commutator shaft 5 to turn in one direction or the other, which shaft will accordingly lift or lower chamber 13 so that said chamber will have a definite position for every definite pressure exerted on the surface of the mercury through connection 17. A pointer 60 can therefore be attached to the chamber 13 or yoke 11 so that it will pass in front of a scale 61 permanently fastened to frame 1. Said scale can be graduated in inches of waterhead, pounds per square inch and any other convenient units so that the pointer will always coincide with the division on the scale that corresponds with the pressure exerted on the mercury within chamber 13. Furthermore since the commutator shaft 5 turns in one direction or the other in exact proportion to any change in the pressure above the mercury in chamber 13, the brush 20 which is permanently fastened to said shaft will also operate an electric recording gauge located at any distance from the source of pressure by closing consecutively certain circuits through commutator segments 22, 23 and 24. Just how this is accomplished I will presently describe in complete detail.

The recording gauge, which can be located at any distance from the commutator, which controls its operation, continually indicates and records the pressure of the gas or fluid above the mercury in chamber 13 by means of a marker, such as a pencil, pen, or some pointed instrument, which is movable, and with relation to which a chart having a smooth surface is movable so that notations may be made thereon, said chart consisting preferably of a sheet or card, as 31, which is carried by a revolving drum 46, whose central spindle 47 is supported in the frame 48. See Figure 2. The drum 46 is revolved at the proper speed by means of a suitable clockwork or other agent (not shown). The card 31 may be calibrated or outlined in any acceptable manner. 33 denotes one form of marking device, which is pivoted to a vertically-movable holder 34, having a screw-threaded opening through which passes a vertical screw-shaft 32 which has bearings at top and bottom in the frame 48. As the screw shaft 32 is rotated in one direction or the other, it carries the marker 33 up or down so that the line traced thereby on the face of the card 31, is the result of the vertical motion of the pen and the horizontal motion of the card. The nature of the line traced depends upon the degree of change in the pressure of the gas or fluid to be measured, since the pen moves up or down in exact proportion to any and every change in said pressure, due to the controlling effect of the commutator on the armature 28 which causes said armature to rotate in one direction or another, depending on whether the motor 3 has lifted or lowered chamber 13. The means for transmitting motion to the marker shaft will be hereinafter described. Thus a line is traced on the chart which is a true graph or record of the measured pressure for every instant of time represented by the horizontal travel of the chart. A vertical stationary pin 35 engages a slotted projection 36 on the holder 34, and prevents the holder from rotating while traveling up and down on the screw shaft; and a spring 49 attached to the pencil and to the holder keeps the point of the pencil close against the face of the card 31.

The upper end of the marker shaft 32 is fastened to a spindle 29, around which is grouped a number of electromagnets 30 which are in electric circuits that include the commutator segments 22, 23 and 24, so that said magnets may be successively energized to create a magnetic field which will attract and rotate an armature 28 that is secured to spindle 29. These magnets 30 are mounted on a base 50 that rests on frame 48, and are arranged in pairs, the members of each pair being wired together, and in some cases being diagonally opposite to each other, as for example, A and $A^1$ which are diagonally opposite to each other and connected by a wire $a^1$; B and $B^1$ which are diagonally opposite to each other and connected by a wire $b^1$; C and $C^1$ which are directly opposite to each other and connected by a wire $c^1$. The armature 28 is preferably cruciform and is shaped with terminals 26 at the ends of each arm, and these terminals lie above but out of contact with the magnets and travel in a circular horizontal path over the magnets under the attracting influence of the latter as the pairs are respectively energized. The circuits that include these pairs of magnets are readily seen in diagrammatic form in the upper right hand part of Figure 1. A conducting wire $m$ leads from the commutator segment 22 to the magnets B, $B^1$, and then through battery 25 to binding post 51 and through frame 1 to shaft 5 and commutator spring 20 to complete the circuit which is closed when spring 20 rests on segment 22, and this circuit will energize the magnets B, $B^1$, and cause them to attract the two nearest terminals 26 and give a rotary impulse to armature 28, which turns it exactly 30 degrees. Also a conducting wire $o$ leads from the segment 23 to magnets A, $A^1$, and then through battery 25 to binding post 51 and other parts to the commutator, so that when spring 20 rests on segment 23 a circuit will be closed that will cause the current to energize magnets A, $A^1$, and impart a further rotary motion of 30 degrees to the armature 28. And a wire $n$ leads from segment 24 to magnets C, $C^1$, and establishes a similar circuit when the same is closed by contact of spring 20 with the segment 24, and the magnets C, $C^1$, become energized so as to exert an attracting power on the armature 28 and still further rotate the same a like amount. Thus as the commutator shaft 5 turns in one direction the armature 28 will also turn in one direction and the number or revolutions turned by the armature will be in exact proportion to the number of revolutions turned by the commutator shaft. In the same manner when the commutator shaft turns in the opposite direction the armature 28 will also turn in the opposite direction. As the armature is carried by the spindle 29 which forms a part of or is secured to the marker shaft 32, the rotation of the armature in one direction or the other will cause the marker to move up or down. Thus we see how the rotation of the primary upright shaft 5 controls the movement of the devices that keep the record.

The operation of my improved recording device is readily understood from the foregoing description of the construction and arrangement of parts, without any further lengthy statements. When the mercury and the electrode are out of contact, as shown in the drawing, the magnet 27 will be de-energized and hence the circuit through the motor will be closed so as to drive the motor in one direction, which will cause a certain rotation of shaft 5 and an impartation of motion to the commutator members in such sequence as to effect a travel of the marker up or down as the case may be, an operation which will continue until the motor 3 has sufficiently lifted chamber 13 to bring the mercury into contact with the electrode so that the reversing circuit is closed and the other opened, whereby the motor will be reversed and the marker caused to travel in the opposite direction to make an opposite registry. Thus when the pressure to be measured decreases, the mercury level in chamber 15 falls, thereby breaking contact with the contact pin 16. This causes the motor 3 to lift chamber 13 until the mercury in chamber 15 is again in contact with the contact pin 16, when the motor will be reversed. Furthermore while the motor 3 is lifting chamber 13, as I have described, it will at the same time revolve the brush 20, which through the commutator segments causes the pen 33 of the recording gauge to be lowered in exact proportion to said decrease in pressure. In the same manner when the pressure to be measured increases in chamber 13 the mercury level in chamber 15 rises, thereby making contact with the contact pin 16. This causes the motor 3 to lower chamber 13 until the mercury in chamber 15 is again out of contact with the contact pin 16, when the motor will reverse; and while the motor is thus lowering chamber 13, it at the same time revolves the brush 20 in the opposite direction which through the commutator segments 22, 23, and 24 causes the pen 33 of the recording gauge to rise in exact proportion to said rise in pressure. Again, when the pressure to be measured is constant the mercury in chamber 15 will be either in contact or out of contact with contact pin 16. When out of contact the motor will run in one direction for an instant until it has brought the mercury into contact again, and when in contact the motor will run for an instant in the opposite direction until it has brought the mercury out of contact again. The motion thus required to simply bring the mercury into and out of contact with the contact pin is however very small, so that when the pressure to be measured is constant the up and down motion of chamber 13 caused by the repeated reversal of the motor to merely break and make contact, becomes only oscillatory between very small limits. Thus when the pressure is constant, the very slight back and forth motion of the commutator shaft is not sufficient to transmit motion to the pen 33 of the recording gauge which under constant pressure draws a straight horizontal line. The pen or marker will therefore move up or down in exact proportion to any change in the pressure applied to chamber 13 through the connections. It will therefore be fully understood how my improved means operate to keep a constant level for the fluid or liquid in the fixed chamber, said level being always at a point where the electric connection between the contact pin 16 and the mercury is made and broken. But with respect to the details of construction and operation, they may vary very widely, depending upon the character of the specific details embodied in the construction, since my invention covers a great variety of possible changes.

So far as the recording device is concerned, another form may be substituted therefor with good results and I do not wish to be confined to the invariable use of the present one. Also many other changes and substitutions may be made without departing from the essence of my invention; and in many respects the mechanical and electrical details may be revised, added to or subtracted from, provided the same result is attained and the leading features remain unimpaired, and I therefore reserve the liberty of making all such changes as may be made within the meaning of my claims which follow.

Having thus described my invention, what I claim as new and desire to secure by Letters Patent, is:—

1. In a device of the class described, a U-tube containing a fluid and having a fixed and a movable member, said fluid being exposed to variable pressure, in combination with means for keeping the level of the fluid in the fixed member substantially constant within narrow limits.

2. In a device of the class described, two chambers each containing liquid exposed to different pressures, a flexible connection which communicates the liquid in one chamber with the liquid in the other in combination with means for keeping the quantity of the liquid in each chamber substantially the same that it would be when equal pressures exist above the surfaces of the liquid in the respective chambers.

3. In a device of the class described, a U-tube having flexible legs and containing liquid exposed to pressure fluctuations, in combination with means for keeping the position of the liquid in the U-tube substantially constant within narrow limits with respect to the walls of the U-tube.

4. In a device of the class described, a U-tube whose members are interrelatively movable and contain a liquid exposed to pressure, in combination with means for keeping the relative position of the liquid and the walls of the U-tube substantially constant within narrow limits.

5. In a device of the class described, a U-tube consisting of dual interrelatively movable united hollow terminals containing a fluid exposed to pressure changes, in combination with means for keeping the fluid level in each terminal substantially constant within narrow limits with respect to the walls of the terminals irrespective of said pressure changes.

6. In a device of the class described, a U-tube, the legs of which are movable with respect to each other and contain a quantity of fluid, in combination with means for keeping the level of the fluid in each leg practically constant within narrow limits with respect to the walls of the respective legs irrespective of whatever pressure may be applied to the surface of the fluid.

7. In a device of the class described, a U-tube consisting of dual interrelatively-movable united hollow terminals containing fluid exposed to pressure changes, in combination with means for keeping the level of the fluid practically constant with respect to the walls of the terminals whatever may be the pressure changes.

8. In a device of the class described, a U-tube containing liquid and whose legs are movable with respect to each other, in combination with means for admitting pressure to the space above the level of the liquid in one or both legs, a motor mechanism to change the relative position of the legs of the U-tube, and operating in one direction or the reverse to some definite point depending upon the vertical distance between the levels of the liquid in the legs of the U-tube, in order that the fluid level may be kept substantially invariable within narrow limits with respect to the walls of the U-tube irrespective of any pressure changes.

9. In a device of the class described, a U-tube containing liquid exposed to pressure and having movable legs, the relative elevation of which is changeable, in combination with a driving means for changing the relative position of the legs of the U-tube, said driving means operating in one direction or the other, accordingly as the difference in the pressure exerted on the surface of the liquid in one leg and that exerted on the surface of the liquid in the other leg is increasing or decreasing, the whole device operating so as to keep the level of the fluid practically constant within narrow limits at all times with respect to the walls of the U-tube irrespective of all pressure changes.

10. In a device of the class described, a bent tube whose legs contain a fluid, one of said legs being movable, and the fluid being exposed to pressure in both legs, in combination with actuating means for the movable leg operating in one direction or the other accordingly as the difference in the pressure exerted on the surface of the fluid in one leg and that exerted on the surface of the fluid in the other leg is increasing or decreasing.

11. In a device of the class described, a U-tube containing a quantity of fluid and having a fixed and a movable leg, said fluid being exposed to fluctuations of pressure, in combination with means for keeping the level of the fluid in the fixed leg substantially constant within definite limits irrespective of said fluctuations.

12. In a device of the class described, a U-tube containing a quantity of fluid and having a fixed and a movable leg, with different pressures exerted in the respective legs, in combination with means for keeping the level of the fluid in the fixed leg virtually the same that it would be when the pressures exerted in the respective legs are equal.

13. In a device of the class described, a U-tube having a fixed and a movable leg and containing a quantity of fluid which is exposed in the movable leg to fluid-pressure fluctuations, in combination with means for keeping the level of the fluid in the fixed leg substantially constant within narrow limits, irrespective of such fluctuations.

14. In a device of the class described, a U-tube having a fixed and a movable leg and containing a fluid electrode, a second electrode carried by one of the legs and contacting at times with the fluid electrode, and an electric motor in circuit with said electrodes for imparting motion to the movable leg.

15. In a device of the class described, a U-tube having a fixed and a movable leg and containing a fluid electrode, a non-fluid electrode carried by one of the legs and contacting at times with the fluid electrode, and an electric motor in circuit with said electrodes for moving the movable leg in one direction or the other and making and breaking the contact between the electrodes.

16. In a device of the class described, a U-tube having a fixed and a movable leg and containing a fluid electrode, a second electrode consisting of a fixed contact pin in the fixed leg, which pin contacts at times with the fluid electrode, and means for keeping the level of the fluid electrode substantially constant in the fixed leg, irrespective of any change in the pressure of the same in the movable leg.

17. In a device of the class described, a U-tube having a fixed and a movable leg and containing a fluid electrode, a second electrode consisting of a fixed contact pin in the fixed leg, which contacts at times with the fluid electrode, and means for keeping the level of the fluid electrode substantially constant in the fixed leg during fluctuations in pressure in the movable leg, said means including a motor in circuit with the electrodes for imparting motion in either direction to the movable leg.

18. In a device of the class described, a U-tube having a fixed and a movable leg and containing a quantity of fluid which is exposed in the movable leg to fluid-pressure fluctuations, in combination with means for restraining the motion of the fluid in the fixed leg irrespective of such fluctuations, said means including a motor for moving the movable leg in one direction or the reverse.

19. In a device of the class described, a U-tube having a fixed and a movable leg and containing a quantity of fluid which is exposed in the movable leg to fluid-pressure fluctuations, in combination with means for keeping the level of the fluid substantially constant in the fixed leg irrespective of such fluctuations, said means including an electric motor and electric circuits controlled by the fluid-pressure fluctuations, whereby the movable leg is caused to adjust itself and its fluid contents in one direction or the reverse.

20. In a device of the class described, a U-tube containing a quantity of fluid and having a fixed and a movable leg, said fluid being exposed to fluctuations of pressure, in combination with means for keeping the level of the fluid in the fixed leg substantially constant, irrespective of said fluctuations, and a recorder actuated by said means for keeping a record of the latter.

21. In a device of the class described, a U-tube containing a quantity of fluid and having a fixed and a movable leg, said fluid being exposed to fluctuations of pressure, an electric motor for keeping the level of the fluid substantially constant in the fixed leg, said motor acting to cause the movable leg to adjust its position, a recorder for the fluctuations, and electrical connections between the recorder and the motor, so that the recorder may be located at any distance away from the pressure fluctuating fluid.

22. In a device of the class described, a U-tube having a fixed and a movable leg and containing a quantity of fluid which is exposed in the movable leg to fluid-pressure fluctuations, in combination with means for keeping the level of the fluid substantially constant in the fixed leg irrespective of such fluctuations, said means including a motor for moving the movable leg in one direction or the reverse, together with a recorder for the fluctuations whose operation is under the control of said motor.

23. In a device of the class described, a U-tube having a fixed and a movable leg and containing a quantity of fluid which is exposed in the movable leg to fluid-pressure fluctuations, in combination with means for keeping the level of the fluid substantially constant in the fixed leg irrespective of such fluctuations, said means including an electric motor and circuits controlled by the fluid-pressure fluctuations whereby the movable leg is caused to adjust itself and its fluid contents in one direction or the other, together with a recorder for the fluctuations, whose operation is under the control of the said motor.

24. In a device of the class described, a U-tube having a fixed and a movable leg and containing a quantity of fluid which is exposed in the movable leg to fluid-pressure fluctuations, in combination with means for keeping the level of the fluid substantially constant in the fixed leg irrespective of such fluctuations, said means including an electric motor and circuits controlled by the fluid-pressure fluctuations, whereby the movable leg is caused to adjust itself and its fluid contents in one direction or the other, together with a recorder for the fluctuations, having a marker, a commutator operating with circuits that move the marker, said commutator being under the actuating impulses of the motor, and means connecting the motor and commutator.

25. In a device of the class described, a U-tube having a fixed and a movable leg and containing a fluid, in combination with means for keeping the level of the fluid substantially constant in the fixed leg, irrespective of any change of pressure in the movable leg, said means including an electric motor and circuits controlled by the pressure fluctuations, whereby the movable leg is moved up or down, a recorder for the fluctuations, having a marker provided with a drive-shaft, an armature on said shaft, a series of electromagnets which successively attract the terminals of the armature and rotate the same, a commutator controlling the circuits which energize the electromagnets, and connections between the motor and the commutator.

26. In a device of the class described, a U-tube having a fixed and a movable leg and containing a fluid, in combination with means for keeping the level of the fluid substantially constant in the fixed leg, regardless of changes of pressure in the movable leg, said means including an electric motor and circuits controlled by the pressure fluctuations, for adjusting the movable leg, a recorder for the fluctuations, a marker therefor, provided with a drive-shaft, a cruciform armature on said shaft, a series of electromagnets which successively attract the terminals of the armature and rotate the same, a commutator controlling circuits through the electromagnets and connections between the motor and the commutator, consisting essentially of intergeared cross shafts, one being the motor shaft and the other a shaft carrying the commutator brush and on which shaft the movable leg travels up and down.

27. In a device of the class described, a U-tube having a fixed and a movable leg and containing a fluid serving as an electrical conductor, in combination with means for keeping the level of the fluid substantially constant in the fixed leg, and means including an electric motor and circuits, a contact in one of the legs whereby a circuit is closed when the fluid conductor departs from such contact, together with a reversing relay to cause the motor to run in one direction or the other.

28. In a device of the class described, a U-tube having a fixed and a movable leg and containing a fluid serving as an electrical conductor, in combination with means for keeping the level of the fluid substantially constant in the fixed leg, said means including an electric motor and circuits, a contact pin in the fixed leg whereby a circuit is closed when the fluid conductor meets said pin and broken when the fluid conductor leaves said pin, all arranged so that one circuit will drive the motor in one direction when the said contact pin and fluid conductor are in contact, and another circuit in the other direction when they are out of contact, and a reversing relay operative with said circuits.

29. In a device of the class described, a U-tube having a fixed and a movable leg and containing a fluid serving as an electrical conductor, in combination with means for controlling the level of the fluid in the fixed leg, said means including an electric motor and circuits, a contact pin in the fixed leg, whereby a circuit is closed when the fluid conductor meets said pin and broken when the fluid conductor leaves said pin, all arranged so that one circuit will drive the motor in one direction when the said contact pin and fluid conductor are in contact, and another circuit in the other direction when they are out of contact, a reversing relay operative with said circuits, a recorder for the fluctuations, having a marker provided with a drive-shaft, an armature on said shaft, a series of electromagnets which successively attract the terminals of the armature and rotate the same, a commutator controlling the circuits which energize the recorder magnets, and connections between the motor and the commutator.

30. In a device of the class described, a U-tube having a fixed and a movable leg and containing a fluid serving as an electrical conductor, in combination with means for keeping the level of the fluid substantially constant in the fixed leg, said means including an electric motor and circuits, a contact pin in the fixed leg, whereby a circuit is closed when the fluid conductor meets said pin and broken when the fluid conductor leaves said pin, all arranged so that one circuit will drive the motor in one direction when the said contact pin and fluid conductor are in contact and another circuit in the other direction when they are out of contact, a reversing relay operative with said circuits, a recorder for the fluctuations, a marker therefor, provided with a drive-shaft, a cruciform armature on said shaft, a series of electromagnets which successively attract the terminals of the armature and rotate the same, a commutator controlling circuits through the electromagnets, and connections between the motor and the commutator, consisting essentially of intergeared cross-shafts, one being the motor shaft and the other a shaft carrying the commutator brush and on which shaft the movable leg travels up and down.

31. The combination with two intercommunicating chambers containing a fluid, one of which chambers is movable relatively to the other, and the fluid in one chamber being exposed to fluid-pressure fluctuations, of means for lifting and lowering the movable chamber, and one or more electric circuits opened and closed by the pressure fluctuations and the movement of the movable chamber for supplying motive power to the lifting and lowering means.

32. The combination with two intercommunicating chambers containing a fluid, one of which chambers is movable relatively to the other, and the fluid in one chamber being exposed to fluid-pressure fluctuations, of means for lifting and lowering the movable chamber, including an electric motor and circuits controlled by the pressure fluctuations and the movement of the movable chamber for supplying power to the lifting and lowering means, together with a screw shaft engaging the movable chamber and rotated in one direction or the other by the motor.

33. The combination with two chambers of a tubular connection between them, one being movable and the other stationary, and both containing a fluid substance which is exposed to pressure fluctuations in the movable chamber, means for raising and lowering the latter, a motor for imparting motion to said means, a recorder, and means whereby the raising and lowering means is communicated to the recorder.

34. The combination with a pair of chambers having a flexible tubular connection and containing fluid, one being stationary and the other movable, a screw shaft engaging the movable chamber and on which it travels up or down, a motor for rotating said shaft, automatic means for reversing the motor so that it may run in either direction, a recorder operated through connections with the aforesaid screwshaft, all arranged to record the fluctuations of a gas or other substance acting against the fluid in the movable chamber.

35. The combination with a pair of chambers having a flexible tubular connection and containing a fluid, one of which chambers is movable relatively to the other, a screw shaft engaging the movable chamber and on which it travels in either direction, a second shaft at right angles to the other, gearing connecting the shafts, a motor for driving said second shaft, a recorder operated through connections with the aforesaid shafting, all arranged to record the fluctuations of a gas or other substance acting against the fluid in the movable chamber.

36. The combination with a pair of chambers having a flexible tubular connection and containing a fluid, one of which chambers is fixed and the other movable, of an electric motor and circuits controlled by the movement of the movable chamber and the action of the fluid in the fixed chamber in making and breaking circuit, and a recorder to which all the fluctuations of pressure in the movable chamber are transmitted.

37. The combination with two intercommunicating chambers containing a fluid, one of which is movable relatively to the other, while the fluid in one chamber is exposed to fluid pressure fluctuations, of means for lifting and lowering the movable chamber, a recording device, mechanism operating the same and actuated by the movement of said movable chamber, and an electric circuit opened and closed by the pressure fluctuations and the movement of the movable chamber for supplying motive power to the lifting and lowering means.

38. The combination of two intercommunicating chambers containing a fluid, one of which is movable relatively to the other, while the fluid in one chamber is exposed to fluid pressure fluctuations, said fluid in the chamber serving as an electrode, an electric circuit having a terminal projecting into the fixed chamber to be met at times by the fluid electrode, means for lifting and lowering the movable chamber, a recording device, electric mechanism for driving it, a commutator for said mechanism, all arranged to graphically show the fluctuations in the movable chamber.

39. In a device of the class described, the combination of two chambers, tubular means flexibly connecting them, said chambers and tubular means containing a liquid which is exposed to different pressures in the two chambers, and means for keeping the quantity of liquid in each chamber substantially the same regardless of whatever pressure may be exerted on the liquid.

40. In a device of the class described, a U-tube having legs that are movable with respect to each other, and containing a liquid, in combination with means for changing the relative elevation of the legs of the U-tube so as to maintain within minute limits a substantially constant position of the liquid with respect to the walls of the U-tube for any and all pressures that may be exerted on the liquid.

In testimony whereof I hereunto affix my signature.

FRITZ FREDERICK UEHLING.